United States Patent [19]

Miedaner

[11] 4,176,105

[45] Nov. 27, 1979

[54] HIGH TEMPERATURE MINERAL FIBER BINDER

[75] Inventor: Patrick M. Miedaner, Parkville, Mo.

[73] Assignee: Certain-Teed Corporation, Valley Forge, Pa.

[21] Appl. No.: 830,590

[22] Filed: Sep. 6, 1977

[51] Int. Cl.$^2$ ............................................. C08L 61/06
[52] U.S. Cl. ................................. 260/29.3; 427/221; 428/36; 525/504; 525/506
[58] Field of Search .................... 260/29.3, 515, 59 R; 528/132, 134

[56] References Cited

U.S. PATENT DOCUMENTS

| 2,931,738 | 4/1960 | Stalego | 260/39 R |
| 3,684,467 | 8/1972 | Smucker et al. | 260/29.3 |
| 4,045,398 | 8/1977 | Dahms | 260/29.3 |

*Primary Examiner*—J. Ziegler
*Attorney, Agent, or Firm*—John T. Synnestvedt; Ernest G. Szoke

[57] ABSTRACT

A modified phenol formaldehyde condensate is reacted with boric acid and cured in the presence of a polyfunctional nitrogeneous compound to provide a binder for mineral wool fibers which is particularly suited for thermal insulation products intended for high temperature service.

8 Claims, No Drawings

HIGH TEMPERATURE MINERAL FIBER BINDER

BACKGROUND OF THE INVENTION

The manufacture of mineral fiber thermal insulation is carried out according to one of a number of continuous processes wherein the molten mineral material flowing from a melting furnace is divided into streams and attenuated into fibers. The attenuation is effected by centrifuging and/or fluid jets to form discontinuous fibers of relatively small dimension which are collected by randomly depositing on a moving foraminous conveyor belt. The fibers are collected in a felted haphazard manner to form a mat. The volume of fiber in the mat will be determined by the speed of fiber formation and the speed of the belt. In order to produce most thermal insulating products, the fibers must be bonded together in an integral structure. To achieve this binding, a curable binder material is added to the mineral wool. The curable binder composition is generally formulated as a liquid to be sprayed onto the fibers as they are dropping onto the collecting conveyor belt. The layer of fiber with binder is then compressed and shaped into the form and dimensions of the desired thermal insulating product such as pipe or board and passed through a curing oven where the binder is cured fixing the size and shape of the finished insulating product by bonding the mass of fibers one to another forming an integral composite structure. Various materials have been used as binder ingredients including both organic and inorganic materials generally blended for different properties. The organic binder materials most commonly employed are heat curable thermosetting resin systems of the phenol formaldehyde type.

Such binders are generally provided as water soluble or water dispersable compositions which can be easily blended with other ingredients and diluted to low concentrations which are readily sprayed onto the fiber as it falls onto the collecting conveyor. The binder composition is generally applied in an amount such that the cured binder constitutes about 5% to about 10% by wt. of the finished product though it can be as little as 1% or less or as high as 20% or more, depending upon the type of fiber product. Optimally, the amount of binder for most thermal insulating products will be the amount necessary to lock each fiber into the mass by bonding the fibers where they cross or overlap. For this reason, it is desired to have binder compositions with good flow characteristics so that the binder solution can be applied to the fiber at a low volume that will flow to the fiber intersections.

Generally, the binder system requirements are for a low cost water soluble or water dispersable composition which can be easily applied and readily cured during normal production cycles. The product should be relatively stable for periods of time long enough to permit mixing and application at temperatures ordinarily encountered in fiberizing plants and the composition should be dilutable in order to permit variations in concentrations for different end products. The cured binder product must provide a strong bond with sufficient elasticity and thickness recovery to permit reasonable shipping and in-service deformation of the thermal insulating product. It must be moisture resistant so that is will not swell under humid conditions. It must be odor free and non-corrosive to metals with which it comes in contact. The binder should be capable of withstanding temperatures as high as the temperature that the mineral fiber can withstand, particularly for pipe insulation where the pipeline is used for hot fluids. The mineral fibers can be any of the materials which are capable of being fiberized. Typical binder compositions for glass are prepared as aqueous solutions or dispersions of partially condensed phenolic formaldehyde resins to which are added a variety of modifiers or agents to improve the spraying, flowing or similar application characteristics as well as the bonding strength, temperature resistence and other in-service features of the cured resin.

A binder composition much desired is one that can withstand service temperatures of 700° to 950° F. Numerous attempts have been made to provide such high temperature resistant binders with little acceptance for practical commercial utility. A particularly troublesome aspect of binders prepared from phenol formaldehyde resin systems is the tendency towards punking when subjected to temperatures in excess of 600° F. and higher which are within the range of temperatures that may be encountered in use. The phenol formaldehyde resin system in the final thermoset stages can undergo exothermic oxidation. Since the mineral fiber product is an excellent heat insulator, the heat given off by any exothermic reaction in the binder is confined and becomes cummulative until temperatures are attained which cause thermal decomposition of the organic binder materials. In some instances, the decomposition products will have an ignition temperature lower than the corresponding temperature of the surrounding composition and may burst into flame.

The characteristic of exothermic decomposition without flame is referred to as "punking". It can continue at a slow rate for a considerable length of time ultimately resulting in total decomposition of the binder with consequent deterioration of the fiberglass insulating product. Punking can be initiated in the cured phenolic binder systems by subjecting the thermal insulating product to elevated temperatures. There are very few mineral fiber thermal insulations produced with phenolic resin compositions that are commercially available at the present time which can withstand temperatures in excess of about 600° F. to 700° F. without punking though numerous attempts have been made to formulate suitable binder compositions which can withstand high temperatures since generally the glass fibers can withstand temperatures up to 1200° to 1300° F. before softening. In fact, the glass fiber most commonly used in thermal insulating products at present has a Littleton softening point between 1250° and 1300° F. Accordingly, there is a definite need for a high temperature resistant binder which will extend the use of these glass fiber materials to high temperature service.

In the past, a variety of approaches have been taken in an effort to formulate high temperature binder compositions using phenolic resins as the primary binder ingredient. Modification of the phenolic formaldehyde by the addition of nitrogeneous modifiers such as dicyandiamide are disclosed in U.S. Pat. No. 3,223,668. Others have tried the use of borates of various sorts as additions to the binder composition; U.S. Pat. No. 2,931,738, U.S. Pat. No. 3,002,857, U.S. Pat. No. 3,253,948 and U.S. Pat. No. 3,839,236.

Where modified binder compositions have been employed to achieve high temperature resistence, frequently, the ingredients intended to improve anti-punking properties of the phenolic resin have also altered the curing property so that a complete cure is either not achievable or can be achieved only over a period of time which is not practical for normal production in manufacture of thermal insulating products. In still other cases, other properties such as dilutability, sprayability, bonding strength and the like have been adversely affected.

Thus among the many patents pertaining to binders, the problem of punking has been repeatedly addressed though the problem still exists and commercial products which employ a phenolic resin system and which can be used under circumstances where temperatures in excess of 600° F. are encountered are presently uncommon. It is believed that the present novel binder composition fills the recognized need for a phenolic binder system that has all of the necessary properties and which will cure to provide a binder that can withstand temperatures in the range of 700° to 950° F.

In approaching the problem in formulating binder compositions with phenolics, it is recognized that the chemical composition cannot be precisely established in view of the recognized uncertainty with respect to the composition of phenolic formaldehyde condensations. Furthermore, since it is desired to use low cost material in formulating binder compositions, the phenolic starting materials generally employed are not of high purity so that the condensates are formed from a phenol which is itself a mixture of materials. In order to achieve desired reproduceability with phenolic binder compositions, efforts are often directed towards reproducing the functional characteristics by on-line adjustment since it is preferred to have consistent performance characteristics. Accordingly, consistent binder compositions can be produced by measuring the product quality and adjusting the composition to provide consistent quality even though the composition of the binder system may vary owing to variations in the starting materials and the adjustments in blending with other ingredients. Checking the end product in order to determine the proportion of ingredients or the reaction conditions for preparing phenol formaldehyde resin systems has been done in the past, for example, in U.S. Pat. No. 3,248,368, the phenol formaldehyde condensation process is controlled to produce desired end results. Other approaches have been to blend various condensation products, for example as taught by U.S. Pat. No. 3,207,652.

Accordingly, it is possible to provide a binder composition which can be formulated continuously or if batchwise then batches of consistent quality can be produced by monitoring the characteristics of the cured binder and altering the composition to provide consistent performance characteristics such as temperature resistance, bonding strength, sprayability and the like. To this end, the present invention sets forth several specific formulations for new high temperature binder compositions and further it teaches a method of preparing binder compositions and thermal insulation products in which the ingredients are combined in accordance with stoichiometric proportions determined by the nature of the phenol formaldehyde starting material. Stoichiometric control is achieved through titration to determine the necessary quantities and by thermal analysis of the end product. The novel binder compositions can be employed in thermal insulation manufacturing operations currently in use commercially, to provide a product with consistent and reliable high temperature resistance, good sprayability and flow characteristics and high bonding strength and which will cure under process conditions generally in use in the production of glass fiber thermal insulation.

Accordingly, it is an object of the present invention to produce an inexpensive polymerizable aqueous phenolic binder composition which, when cured, will not exhibit any punking under continuous high temperature service within a range of 700° to 950° F.

These and other aspects of the invention will be more fully understood from the description and claims which follow. The description of the background for this invention as well as the disclosure of the improved binder products is made by reference to glass fiber products though it is to be understood that the disclosure applies equally to other mineral fiber products.

SUMMARY OF THE INVENTION

It has now been found that a practical high temperature resistant binder composition suitable for application to mineral fibers in the manufacture of thermal insulating products especially glass fiber products provided in shaped or molded form such as boards or pipe insulation, etc. for high temperature service can be prepared from relatively inexpensive modified phenol formaldehyde condensates which are further reacted in accordance with the process aspect of this invention to provide a binder product that is resistant to punking. The binder compositions of the present invention possesses high water dilutability for spray application and when a composition of the type disclosed is applied to glass fibers, it flows to the intersects where it cures to form a high strength binder capable of withstanding temperatures of 700° to 950° F. The novel binder compositions of the invention are prepared by combining:

(A) an aqueous phenol formaldehyde condensate primarily consisting of minimally inter-condensed poly-hydroxymethyl phenols, which condensate has been additionally condensed with a polyfunctional nitrogenous compound such as urea or dicyandiamide.

(B) a water soluble boron compound.

(C) a polyfunctional nitrogenous compound or mixtures of such compounds; and (D) optional ingredients customarily employed in binder systems.

The term "phenol formaldehyde condensate" as used herein, means the product resulting from the condensation of phenol and formaldehyde under conditions whereby the condensation reaction is arrested at an early stage so as to yield a product in which the principal condensates are the poly-hydroxymethyl phenols. Such condensates and their preparation are generally known to the art for example in U.S. Pat. Nos. 2,819,251 and 3,248,648.

The terms "modified phenol formaldehyde condensates", "modified condensate" and "nitrogen containing phenol formaldehyde condensate" as used herein mean any phenol formaldehyde condensate as defined above which has additionally been reacted with a polyfunctional nitrogenous compound.

The term polyfunctional nitrogenous compound means any of the compounds which contain at least two reactive nitrogen groups capable of condensing with an hydroxyl group to eliminate water such as dicyandiamide, urea, melamine, guanidine, thiourea and the like.

The term binder composition as used herein means a relatively stable water dilutable composition which will cure to form a thermoset phenol formaldehyde resin.

The term binder system is intended to mean the binder composition diluted for application to a mineral fiber and includes all ingredients in the final spray as applied to the fiber which cure to a thermoset phenol formaldehyde resin.

The term "cured binder" as used herein means the cured resin which bonds together the fibers of a mineral fiber insulation product.

The binder compositions of this invention are prepared from commercially available starting materials by combining them in a relatively easy mixing procedure carried out at ambient temperatures. The binder composition can be used immediately by diluting with water to a concentration suitable for spraying onto glass fiber or the composition can be held as a concentrate for periods up to two weeks or longer without undergoing any detrimental reactions. The stability and shelf life of the product are improved by storing at temperatures of about 50° to 60° F. or lower.

Other conventional binder additives which are compatible may be added to the concentrate or may be combined at the time of dilution to form the final binder system for spraying.

It should be understood that the binder compositions encompassed by this invention may be present in a variety of liquid forms, including solutions, miscible liquids, dispersions, or suspensions and emulsions and the like and combinations of such liquid forms depending upon the optional ingredients blended into the final binder composition and it is understood that the amount comprising the concentration of any particular ingredient may be present in more than one liquid form with proportions in each form changing during the preparation of the binder composition or binder system. Where the term solution or any of the variations thereof is used herein it is intended to include any relatively stable liquid phase.

Ordinarily, the binder composition is diluted and sprayed onto the fiber in relatively low concentrations of the order of 5 to 10% by wt. of solids though for certain products it can be used at lower or higher concentrations or even at full strength if desired. For thermal insulation products the binder is generally applied at a rate which will provide a cured binder of about 5 to 12% by wt. of the total product and most of the time about 5% to about 7% by wt.

The method of application is generally the same or similar to application techniques now in use. After attenuated glass or other mineral fiber has been formed, the still hot fiber is sprayed with the binder system prior to collecting. The hot fiber evaporates much of the aqueous phase of the spray which then becomes tacky holding the fiber mass together and the binder resin begins to set. The fiber product is then further heat treated causing the binder resin to cure and lock the glass fiber in an integrated porous mat of permanently fixed dimensions. The thickness of the fibrous product as well as its density can be controlled. It can be formed as a relatively thin product of about ⅛ to ¼ inch or it can be a thick mat of 6 to 8 inches or more. The density of the product can also be varied widely from a relatively fluffy low density product to a high density mass of 6 to 10 pounds per cubic foot or higher. The present binder is particularly useful in the higher density products i.e. those having a density of about 5 to 7 pounds per cubic foot, which provide a considerable level of insulation in high temperature applications and which are therefore especially suitable for use as pipe insulation to envelop pipe used for conveying high temperature fluids.

The high bonding strength of the present binder together with its high temperature capabilities makes it particularly suitable as a binder for the manufacture of the more dense thermal insulation glass fiber products. These products can be installed for industrial use such as boiler insulation, hot pipe insulation or for insulating high temperature reaction or storage vessels and the like where in-service temperatures are in the range of 700° F. and higher. Glass fiber insulation products of this type are manufactured by shaping the fiber mat into the desired form compressing to the desired density and curing the binder while held in the shaped and compressed form. In the case of pipe insulation, the fiberglass mat is formed as a tubular structure or molded in semi-cylindrical form in accordance with methods known in the art. Generally, these processes are continuous and therefore it is desirable to have the cure rate of the binder composition fit with the production cycle. The present binder compositions have been found to be well adapted to use in the manufacture of fiberglass insulation in accordance with current production methods and cure times acceptable in the industry. The binder compositions of this invention can be fully cured in a period of 2 minutes at cure temperatures generally in use (about 400° to 500° F.). Depending on concentration and temperature curing can be done in about 2 to about 15 minutes at temperatures up to 700° F. or above.

The binder composition can be made up in advance and stored in a tank or reservoir until diluted for use in the same tank or transferred to a dilution tank where it is mixed with water and other compatible ingredients as desired, then pumped to the spray guns for delivery onto the fiber. The binder is cured on the fiber by heating after the fiber product is shaped and compressed.

DETAILED DESCRIPTION OF THE INVENTION

The high temperature resistant binder compositions of the present invention are prepared by combining a water soluble boron compound and a water soluble nitrogenous compound with a modified phenol formaldehyde condensate. The modified phenol formaldehyde condensate comprises the principal resin forming ingredient of the binder compositions of this invention.

The condensates which are suitable for use as the resinous starting materials in constituting the binder compositions can be described as modified A-Stage phenol formaldehyde resins which are substantially water soluble. The predominant chemical components in such condensates are the reaction products resulting when phenol and formaldehyde are condensed under conditions which favor formation of polyhydroxymethyl phenols and further condensing such intermediate polyols with a polyfunctional nitrogenous compound under mild conditions such that the reaction is confined to formation of low molecular weight condensation products. The poly-hydroxymethyl phenols are primarily tri-hydroxymethyl phenols with cis-ortho-hydroxymethyl substitution. Generally, condensation with a polyfunctional nitrogenous compound can be carried out by mixing the phenol and formaldehyde or the phenol formaldehyde condensate with a polyfunctional nitrogenous compound preferably urea or dicyandiamide in an aqueous medium while the phenol formaldehyde condensation reaction product is held at an elevated temperature. The nitrogenous compound can be added during the phenol formaldehyde condensation so long as the condensation is carried out under conditions which prevent the polymerization of phenolic nuclei through methylene bridging or that the condensation reaction is arrested before advancing to the stage where a substantial amount of condensation between phenolic nuclei has occurred. The condensation of phenolic nuclei where it does occur ordinarily takes the form of linear polymers of phenyl moieties linked through methylene groups. For the binder compositions of this invention it is preferred to use phenol formaldehyde condensation products in which polymeric condensation of phenyl moieties through methylene linking is minimal. Techniques for carrying out the condensations in this manner are known to the art and products of this description are generally available. Any of the modified phenol formaldehyde condensates prepared in accordance with known techniques and which meet the requirements set forth herein, are intended to come within the scope of this invention and can be used as the resin forming ingredient in preparing the novel high temperature resistant binders and insulation products.

The modified phenol formaldehyde condensates are preferably those wherein the nitrogenous modifier is a polyfunctional nitrogenous compound more particularly di-functional, that is one in which there are two amido or imino groups capable of reacting with the hydroxymethylene groups of the poly-hydroxymethyl phenols formed when condensing phenol and formaldehyde. The nitrogenous compounds are also preferably selected from the group of low molecular weight compounds wherein nitrogen comprises 20% or more of the molecular weight. The preferred nitrogenous modifier compounds are urea and dicyandiamide though other reactive nitrogen compounds such as guanidine, thiourea, melamine and the like can also be used. The selection of a particular nitrogen modifier will be in part determined by the particular conditions chosen for carrying out the phenol formaldehyde condensation since the compound must be reasonably soluble in the reaction medium at the temperaure used in the reaction.

It will be apparent that a wide variety of art recognized alternatives are available whereby reaction conditions can be varied or altered to provide modified phenol formaldehyde condensates of the type used in preparing the binder formulations of this invention. The modified phenol formaldehyde condensates preferred in the practice of this invention are those wherein the mole ratios expressed as; phenol:formaldehyde:nitrogenous compound, are; about 2.5 to 3:about 6 to 7.5:about 1 (these mole ratios for phenol/formaldehyde/nitrogenous compound can also be expressed as: 2.5 to 3/6 to 7.5/1) and preferably the mole ratios of phenol:formaldehyde:nitrogenous compound are 2.5:7.5:1. Especially preferrred are dicyandiamide modified phenol formaldehyde condensates in which the mole ratio phenol/formaldehyde/dicyandiamide is about 2.5/7.5/1 and urea modified phenol formaldehyde condensates in which the mole ratio phenol/formaldehyde/urea is about 2.5/7.5/1. Such modified condensates are available in aqueous medium containing 30 to 60% solids by weight preferably abou 50 to 60% solids and are relatively soluble at room temperature and above usually at temperatures under about 130° F. The preferred products are those having a free phenol content of less than about 2% by wt. preferably less than 1% by wt. and a free formaldehyde content of less than 5% by wt. and preferably in the range of about 2 to 5% by wt. and wherein nitrogen comprises about 12 to 15% by wt. of the condensate. The condensates are preferably products having a low average molecular weight. Since condensates of this type are generally susceptible to continued polymerization reactions which are accelerated by higher temperatures, the condensate should be used as soon after preparation as is practical and should be stored at room temperature or below i.e. below about 65° F.

Boron compounds suitable for use in preparing the intermediate borate product can be any of the readily available inorganic boron compounds though it is preferred to use a compound which will not generate halide ions or alkaline earth metal ions particularly sodium ions in the binder system, and which can be dissolved in the modified condensate medium at about room temperature i.e. about 65° to 75° F. The preferred boron compound is boric acid though borax or other borates may also be employed. For ease of description, the term boric acid is used hereafter in describing the compositions and their preparation though it will be understood that such description applies as well to the use of analogous borates. Boric acid is added slowly, under stirring, in successive incremental amounts with each incremental amount being added after complete dissolution of the prior addition. Upon completion of the boric acid addition, which is indicated by the point at which there is a marked decrease in the rate of acidification with further additions of boric acid, the pH is immediately adjusted to the pH of the condensate medium prior to addition of boric acid, usually between about pH 7 and 9. Alternatively, if the stoichiometric amount of base necessary to adjust the pH has been previously determined, it can be added in such amount just prior to addition of the predetermined stoichiometric amount of boric acid. The preferred amount of boric acid to be added can be determined by titrating for the point at which no further significant change in pH occurs and measuring the amount of acid added to the endpoint of rapid acidity change. The preferred amount of boric acid is also determined by the amount for which the rate of exotherm decrease is at a minimum. When adjusting the pH back to about neutral pH any suitable base can be used. The preferred neutralizing agent is ammonium hydroxide. If another base is used, it is preferred to avoid introducing sodium ions.

After reaction with boric acid and neutralization, the reaction mixture is blended with an aqueous solution or dispersion of nitrogenous compound. The nitrogenous compound can be added directly to the reaction mixture with continued stirring at about room temperature to give complete solution or dispersion into the reaction mixture.

The nitrogennous compound which is used in preparing the binder composition may be the same or different than that employed in preparing the modified phenolic resin though suitable nitrogenous compounds are generally selected from the same group of compounds, that is, a polyfunctional nitrogenous compound such as urea, dicyandiamide, or similar reactive compounds. Additionally, however, in the case of the nitrogenous compound added in formulating the binder composition, there can also be utilized such condensates an urea formaldehyde, dicyandiamide formaldehyde and the like, particularly where the nitrogenous compound is difficultly soluble in the modified phenol formaldehyde boric acid reaction product. Optional adjuvants are added in appropriate amounts with stirring continued to effect complete solution or dispersion. The composition prepared in this way when applied to glass fiber and cured develops high strength bonds which are resistant to punking and provides a thermal insulation product capable of high temperature service at 700° F. and higher.

Other additives that may be included in the binder composition or binder system as optional ingredients are the conventional adjuvants such as inorganic materials or organic materials such as lubricants, silanes and the like all of which are well known in the art.

The binder compositions of this invention are relatively easy to prepare in actual practice. In general, the compositions can be produced in volumes ordinarily employed in the manufacture of thermal insulation by introducing an aqueous solution of the modified phenol formaldehyde condensate into a mixing vessel equipped with an agitator. Agitation is set at a moderate rate and maintained throughout the process. Water in an amount sufficient to dilute the condensate to about 20 to 25% by wt. on the basis of dry resin solids content is charged to the vessel or may be added before the condensate is added. A neutralizing agent, preferably ammonium hydroxide, is then added in an amount which has been pre-determined as the stoichiometric amount necessary to effect neutralization, based on boric acid acidification to the endpoint of complex formation as described above and neutralization, for an aliquot portion of the condensate being used as starting material. Next the boron compound, preferably boric acid, is added at a moderate rate such that complete solution is continuously obtained. Next, the di-functional nitrogenous compound, preferably urea, is added at a moderate rate in an amount which together with the boron will provide the stoichiometric amount required to condense with the remaining hydroxy groups of the modified phenol formaldehyde condensate. In practice, it is preferred to use both the boric acid and nitrogenous compound in excess over the amounts determined stoichiometrically.

Generally, the boric acid is used at about 10% excess and the nitrogenous compound at even greater excess up to 100% or more. The use of excess boric acid and nitrogenous compound does not increase the temperature resistant properties of the modified phenol formaldehyde resins to the extent that the stoichiometric amounts do as will be apparent from the experimental results below. However, excess amounts can be used to further increase temperature resistance through mass effect so long as the amount in excess is not so great as to produce other undesirable properties such as insolubility and loss of bonding strength.

When solution of the nitrogenous compound has been completed, the binder composition is essentially ready for use though other binder adjuvants such as lubricants, silanes, color modifiers, and the like which are commpatible with the binder composition can be used. The binder composition prepared in this way can be used immediately or held for periods of time in excess of two weeks without loss of essential properties such as dilutability. When sprayed onto the fiber, the binder composition can be diluted with water to the desired solids concentration. Following addition of all the ingredients, stirring or agitation of the binder composition should be continued for one hour or more after which stirring can be stopped. However, when diluted for use, stirring should be resumed during dilution. This process can be employed for batch operations and with suitable modification it can be adapted to continuous preparation of the binder composition. Formulation and storage of the binder composition is preferably carried out at room temperature or below to avoid side reactions and premature polymerization.

In determining the amount of resin to be used in formulating the binder compositions, the modified phenol formaldehyde condensate is presumed to be the condensation product of the nitrogenous compound with the poly-hydroxymethyl phenols with loss of two moles of water for each mole of nitrogenous compound together with an excess of the substituted phenols which preserves the ratio of phenol formaldehyde and nitrogenous compound present in the modified phenol formaldehyde condensate. This condensate is referred to herein as an Effective Molecular Unit and serves as the basis for determining the assumed molecular weight of the modified phenol formaldehyde condensate which is used as the basis for initially estimating the stoichiometric amounts of boric acid and nitrogenous compound to be utilized. In the case of the dicyandiamide modified phenol formaldehyde condensate the Effective Molecular Unit is defined as having a molecular weight of 508 based on a unit composed of:

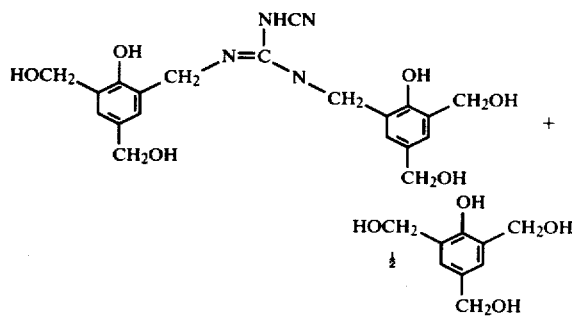

In the case of urea, the effective molecular unit is defined as having a molecular weight of 484, based on a unit composed of:

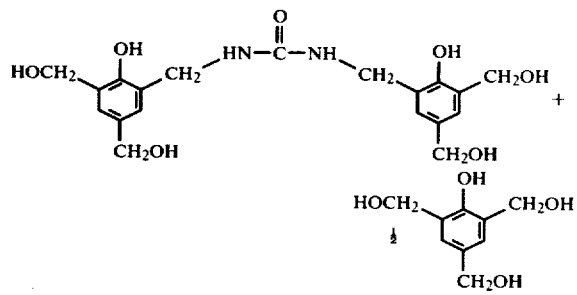

On the basis of these assumed effective molecular weights the amount of boric acid and nitrogeneous compound (preferably urea) to be combined with the condensation is estimated. The amount of boric acid employed is is such that there is provided 1.25 mole of boric acid for each mole of modified phenol formaldehyde condensate taking the molecular weight of an Effective Molecular Unit to be the molecular weight of the modified phenol formaldehyde condensate. The amount of nitrogenous compound employed is determined as an amount which together with the boron coordination is sufficient to condense with all of hydroxymethyl groups in the Effective Molecular Units when combined as a pre-polymer. In the case of a dicyandiamide modified condensate, the estimated amount of di-functional nitrogenous compound is 4 molecular equivalents for each mole of Effective Molecular Unit or 0.8 moles per mole of substituted phenol in the modified phenol formaldehyde condensate. A molecular equivalent is based on a single functional group, i.e., in the case of dicyandiamide one mole is two molecular equivalents or 1 mole of di-functional nitrogenous compound is used for each mole of phenol in the condensate.

As previously indicated, it is preferred that both the boric acid and the nitrogenous compound be used in excess especially the nitrogenous compound. Preferably there is used 1 mole or more of nitrogenous compound for each mole of phenol in the condensate.

While not wishing to be bound by any particular theory as to the mode of action of the novel binder composition, it is believed that the improved temperature resistance in the resulting binder can be attributed to a number of factors which cooperate to reduce the degree of polymerization through methylene linkages between phenyl moieties in the cured resin. By utilizing a modified phenolic formaldehyde condensate of the type indicated, there is provided a low molecular weight prepolymer capable of curing a novel synthetic resin binder with improved properties. The preparation of the modified phenol formaldehyde condensate is known and condensate products suitable for use in the compositions of this invention can generally be prepared from technical grade phenol and commercially available formaldehyde and nitrogenous compound. Condensation conditions when reacting the phenol with formaldehyde are adjusted to provide minimum poly-nuclear condensations, that is, minimum condensation between phenyl moieties. Such condensation products with limited poly-nuclear condensation are also generally more soluble in water. The presence of a reactive nitrogenous compound during the condensation also tends to inhibit condensation of the phenyl moieties through methylene bridges. Alternatively, the condensation of phenol and formaldehyde can be carried to the stage of aromatic polyol formation and stopped, and the polyfunctional nitrogenous compound can be added after the phenol formaldehyde condensation and polyol formation to further condense with the phenol formaldehyde condensates at elevated temperatures, about 100° to 125°0 F. and minimize polymerization through formation of methylene linkages. As has already been described, the modified phenol formaldehyde condensates best suited for the binder compositions of this invention are those in which the principal modifier is dicyandiamide or urea. When such product is treated with boric acid it is postulated that the boric acid reacts with the modified phenol formaldehyde condensate to form a boron complex of good stability. The presence of such complex is consistent with available experimental evidence and based upon the thermal experiments, it appears to contribute substantially to the high degree of thermal resistance observed with the cured resin obtained in accordance with this invention.

Thus, the available evidence supports the existence of such boron complex as a pre-polymr of low average molecular weight. In the case where the nitrogenous modifier is dicyandiamide, a structure has been assigned to the boron complex pre-polymer after neutralization with ammonium hydroxide as follows:

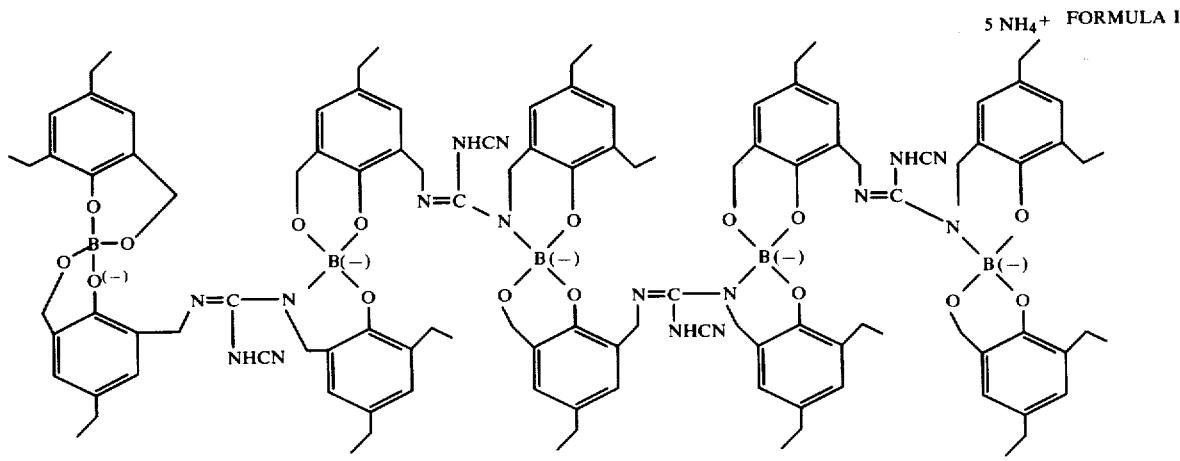

In the case where the nitrogenous modifier is urea, the corresponding structure assigned is as follows:

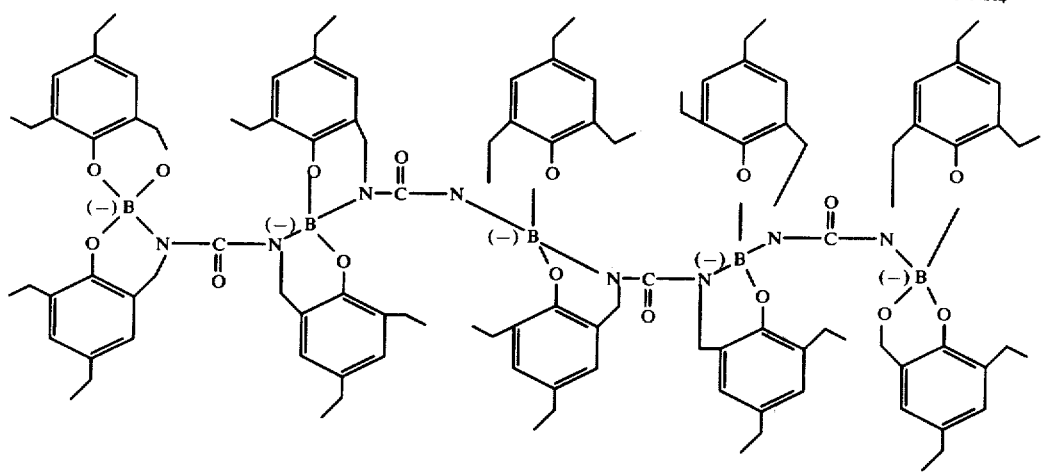

FORMULA II

The use of other nitrogenous modifiers such as melamine, thiourea or guanidine, gives rise to correspondingly similar structures for the complexes in which phenol moieties are linked through di-functional nitrogenous compounds and coordinated with boron through hydroxyl and vicinal reactive hydrogen substituents on each of two phenyl moieties. The tetrahedral boron combines with the aromatic hydroxyl groups and reactive hydrogen substituents which are cis-ortho in configuration and the modified condensates employed are considered to have such configuration for poly-hydroxymethyl phenols so that essentially all the phenyl moieties are available for coordination with boron thereby reducing the likelihood of polymerization through methylene bridging.

Thus, the formation of a boron complex can produce a structure which inhibits formation of methylene links which ordinarily are formed in curing the resin. Additionally, an excess of nitrogenous compound during the high temperature curing stage causes the polymerization to favor cross-linking through the nitrogenous compound and loss of water rather than formation of methylene links. There is accordingly provided, a cured binder in which boron is chemically bonded in the phenolic resin polymer and in which a maximum of the hydroxymethyl groups are condensed with urea or a similar polyfunctional nitrogenous compound in a crosslinked polymeric structure.

In order to demonstrate the high temperature properties of the novel binder compositions and resulting binder a series of tests were carried out which serve also to illustrate the method of pre-determining the optimum amounts of ingredients in making the binder compositions. The procedure utilized in making the experimental samples is essentially the same as that described above with respect to industrial manufacture though the boron compound, preferably boric acid, was added without having the neutralizing agent already present in the reaction mixture since on a laboratory scale neutralization could be readily effected immediately after completion of the boric acid addition. Such a process, while not preferred, is practical when carried out on a limited scale where the rate of boric acid addition can be carefully controlled and neutralization can be effected promptly after completion of the boron addition but is less suited to industrial scale operations.

Generally, the boric acid dissolves in the condensate fairly rapidly at about room temperature, 60° to 75° F., and in amounts which are in excess of the amount of boric acid that could be dissolved in an equal volume of water. The addition of boric acid is accompanied by a rapid and large pH change which is substantially more than the pH change which occurs when boric acid is added to water. The modified phenol formaldehyde condensate in aqueous medium generally has a pH of about 8 which upon addition of boric acid drops to about 2. The addition of boric acid is also accompanied by a color change in the condensate medium with further color change upon neutralization with ammonium hydroxide. The entire process is carried out at ordinary room temperature (about 60° to 75° F.). The modified phenol formaldehyde condensates used in the preparation of the experimental samples are commercially available materials having phenol/formaldehyde/nitrogenous compound mole ratios as previously indicated with no more than about 1.5% free phenol and no more than about 3% free formaldehyde and little or no unreacted nitrogen compound. The dicyandiamide modified phenol formaldehyde used in the preparation of the experimental samples is available as a commercial product from Reichhold Chemicals, Inc. as an aqueous solution having about 56% by wt. solids and sold under the brand name Plyophen 22-387. The urea modified condensate is also available from Reichhold Chemicals, Inc.

Experimental binder compositions prepared in accordance with the method herein were prepared at various concentrations of boron and urea and subjected to testing for stroke cure and exotherm generation in order to confirm optimum ratios of urea and boron to be used in formulating the binder compositions and for comparison with stoichiometric amounts based upon the assumed composition of the modified phenol formaldehyde condensate.

In carrying out the exotherm tests a binder composition is prepared from a modified phenol formaldehyde condensate having 2.5 moles phenol to 7.5 moles formaldehyde to 1 mole of dicyandiamide with less than 1.5% free phenol and less than 3% free formaldehyde in the condensate. The actual amounts used in the experimental binder composition formulations are shown in Table I. The boric acid in amounts as shown was added to an aqueous mixture of the condensate, immediately neutralized with ammonium hydroxide and urea added in amounts as shown. Similar binder compositions were prepared using a urea modified phenol formaldehyde condensate as shown in Table II.

These compositions along with binder compositions consisting of the unmodified phenol formaldehyde condensate without boron or urea and compositions with only urea were submitted to exotherm testing, the results of which, are shown in Tables I and II which follow:

TABLE I

DICYANDIAMIDE MODIFIED PHENOL FORMALDEHYDE CONDENSATE BINDER COMPOSITION

| Formula Number | Moles[a] | Moles[b] $H_3BO_3$ | Moles[c] Urea | Moles[d] $NH_3$ | 10 Min.[e] Exotherm | Binder Dilutability | Stroke Cure[f] 300° F. Sec. | Solubility[g] After Cure |
|---|---|---|---|---|---|---|---|---|
| 1 | 0.1 | 0 | 0 | .000 | 204.8 | | | |
| 2 | | .10 | 0 | .221 | 111.6 | 0 | 63 | NS |
| 3 | | .12 | 0 | .241 | 106.1 | 1.5/1 | 45 | NS |
| 4 | | .14 | 0 | .262 | 109.5 | 1.5/1 | 31 | NS |
| 5 | | .16 | 0 | .273 | 82.1 | 2/1 | 27 | NS |
| 6 | | .25 | 0 | .326 | 74.7 | — | | |
| 7 | | .50 | 0 | .415 | 46.8 | — | | |
| 8 | | .10 | .10 | .206 | 102.9 | — | — | — |
| 9 | | .10 | .25 | .203 | 118.0 | — | — | — |
| 10 | | .10 | .42 | .225 | 110.7 | 2/1 | 138 | NS |
| 11 | | .10 | .50 | .215 | .06.3 | 2/1 | 208 | VSS |
| 12 | | .10 | .58 | .213 | 102.8 | 2/1 | 164 | VSS |
| 13 | | .10 | .67 | .221 | 104.3 | 2/1 | 163 | NS |
| 14 | | .12 | .42 | .263 | 105.5 | 2/1 | 111 | VSS |
| 15 | | .12 | .50 | .252 | 104.1 | 2/1 | 128 | NS |
| 16 | | .12 | .58 | .264 | 100.3 | 2/1 | 122 | NS |
| 17 | | .12 | .67 | .238 | 92.9 | 2.5/1 | 133 | VSS |
| 18 | | .14 | .10 | .255 | 95.9 | — | — | — |
| 19 | | .14 | .25 | .258 | 106.6 | — | — | — |
| 20 | | .14 | .42 | .275 | 105.4 | 2/1 | 78 | VSS |
| 21 | | .14 | .50 | .278 | 96.1 | 2/1 | 103 | VSS |
| 22 | | .14 | .58 | .277 | 94.4 | 2/1 | 138 | NS |
| 23 | | .14 | .67 | .285 | 96.9 | 3/1 | 148 | NS |
| 24 | | .16 | .42 | .275 | 88.0 | 3/1 | 85 | VSS |
| 25 | | .16 | .50 | .286 | 87.0 | 2/1 | 103 | SS |
| 26 | | .16 | .58 | .286 | 85.4 | 2/1 | 118 | SS |
| 27 | | .16 | .67 | .287 | 91.5 | 2/1 | 147 | VSS |
| 28 | | .25 | .10 | .372 | 72.2 | — | — | — |
| 29 | | .25 | .25 | .380 | 82.0 | — | — | — |
| 30 | | .25 | .42 | .378 | 82.1 | — | — | — |
| 31 | | .25 | .50 | .330 | 79.0 | — | — | — |
| 32 | | .25 | .58 | .341 | 78.5 | — | — | — |
| 33 | | .25 | .67 | .336 | 71.6 | — | — | — |
| 34 | | .50 | .10 | .511 | 39.9 | — | — | — |
| 35 | | .50 | .25 | .497 | 46.0 | — | — | — |
| 36 | | .50 | .42 | .449 | 43.7 | — | — | — |
| 37 | | .50 | .50 | .410 | 47.1 | — | — | — |
| 38 | | .50 | .58 | .404 | 46.3 | — | — | — |
| 39 | | .50 | .67 | .405 | 44.7 | — | — | — |

[a]The resin was a dicyandiamide modified phenolic resin manufactured by Reichhold Chemicals, Inc. under the designation Plyophen 22-387. It was a 56% solids system having 1.7% free phenol content and 2.5% free formaldehyde. The amount used was based upon the estimated molecular weight assuming an effective molecular unit as shown in Formula I.
[b]Analytical Reagent grade - used "as received."
[c]Technical grade - used "as received."
[d]Analytical Reagent grade - 29% by wt. $NH_3$ assay - used "as received."
[e]Actual weight of area generated by 1.0 mg. of binder formulation of .10 mm average particle size. Units are: mg chart paper/mg binder. Conversion of area weight to area and thence to millicalories/mgbinder will provide measure of heat where absolute measure of heat released is desired. For purposes of these tests relative exotherms only were required. The ten minute exotherm of Formula 27 was determined to have a fuel value of 7200 BTU/lb. as measured by bomb calorimetry.
Accordingly the data under the exotherm column can be converted to BTU/lb. by multiplying by $\frac{7200}{91.5}$ or 78.69.
[f]Time (in seconds) taken by sample to become unworkable with spatula at 300° F. after water of formation has boiled away. Each value is the average of 2 tests.
[g]Visual index of solubility of cured sample taken from hotplate after stoke cure test completed.
Used to estimate potential susceptability to swelling of binder.
NS = not soluble; VSS = Very slightly soluble; SS - slightly soluble; MS - moderately soluble

TABLE II

UREA MODIFIED RESIN SYSTEM

| Formula Number | Moles (a) Condensate | Moles (b) $H_3BO_3$ | Moles (c) Urea | Moles (d) $NH_3$ | 10 Min. (e) Exotherm | Binder Dilutability | Stroke Cure (f) 300° F. Sec. | Solubility (g) After Cure |
|---|---|---|---|---|---|---|---|---|
| 1 | 0.1 | 0 | 0 | .000 | 217.7 | 00 | — | — |
| 2 | | .09 | 0 | .123 | 113.5 | 2/1 | 29.5 | NS |
| 3 | | .16 | 0 | .221 | 72.5 | 2/1 | 27 | SS |
| 4 | | .05 | 0 | .090 | 105.9 | 2/1 | 53 | NS |
| 5 | | 0 | .14 | -0- | 104.8 | 15/1 | 74 | NS |
| 6 | | 0 | .28 | -0- | 119.0 | 15-20/1 | 90 | NS |
| 7 | | 0 | .42 | -0- | 117.0 | 25/1 | 106 | SS |
| 8 | | 0 | .56 | -0- | 116.1 | 25/1 | 110 | SS |
| 9 | | 0 | .84 | -0- | 71.9 | 25/1 | 142 | NS |

TABLE II-continued

| | | | UREA MODIFIED RESIN SYSTEM | | | | | |
|---|---|---|---|---|---|---|---|---|
| Formula Number | Moles (a) Condensate | Moles (b) $H_3BO_3$ | Moles (c) Urea | Moles (d) $NH_3$ | 10 Min. (e) Exotherm | Binder Dilutability | Stroke Cure (f) 300° F. Sec. | Solubility (g) After Cure |
| 10 | | .08 | .14 | .095 | 85.5 | <2/1 | 52 | NS |
| 11 | | .08 | .28 | .096 | 90.7 | 3/1 | 85 | VSS |
| 12 | | .08 | .42 | .092 | 91.5 | 3/1 | 106 | SS |
| 13 | | .08 | .84 | .092 | 55.4 | ∞ | 332 | MS |
| 14 | | .16 | .14 | .131 | 62.0 | <2/1 | 46 | NS |
| 15 | | .16 | .28 | .144 | 73.4 | 3/1 | 77 | NS |
| 16 | | .16 | .42 | .139 | 72.0 | ∞ | 123 | MS |
| 17 | | .16 | .84 | .138 | 22.3 | ∞ | 324 | MS |
| 18 | | .125 | .14 | .125 | 84.0 | <2/1 | 42 | NS |
| 19 | | .125 | .28 | .138 | 82.1 | ∞ | 73 | NS |
| 20 | | .125 | .42 | .138 | 80.9 | ∞ | 100 | MS |
| 21 | | .125 | .84 | .131 | 49.2 | ∞ | 340 | MS |

(a) The resin was a urea modified phenolic resin supplied by Reichhold Chemical Company as TB 5-3785 and has a phenol/formaldehyde/urea ratio of 2.5/7.5/1.0. The 56% solids resin system was relatively insoluble at 25° C. and completely soluble at 35° C.
(b) Analytical Reagent grade - used "as received."
(c) Technical grade - used "as received."
(d) Analytical Reagent grade - 29% by wt. $NH_3$ assay - used "as received."
(e) Actual weight of area generated by 1.0 mg. of binder formulation of .10 mm average particle size. Units are: mg. chart paper/mg binder. Conversion of area weight to area and thence to millicalories/mg binder to provide the measure of heat can be carried out if an absolute measure of heat released is desired. For purposes of these tests relative exotherms only were required.
(f) Time (in seconds) taken by sample to become unworkable with spatula at 300° F. after water of formation has boiled away. Each value is the average of 2 tests.
(g) Visual index of solubility of cured sample taken from hotplate after stroke cure test completed. Used to estimate potential susceptability to swelling of binder.
NS = not soluble; VSS = very slightly soluble; SS = slight soluble; MS = moderately soluble The procedure used in testing the experimental samples is as follows:

1. The liquid samples prepared as above were tested for stroke cure on a 300° F. hotplate. Approximately 0.22 cc of the formula was placed on the plate and the timer started after the water of formulation had, for the most part, evaporated. The timer was stopped when the formulation was no longer workable with a spatula. Each sample was tested twice and the average "set-time" was recorded as indicated in the columns "stroke cure" of Table I and II.

3. Dilutability was measured on the liquid formulations by taking a 10 ml. portion and adding water to the cloud-point. The volume at the cloud-point divided by the original volume was recorded as indicated in Tables I and II.

4. The exotherm was measured by weighing approximately 5 mg. of the dried, powdered and sieved binder formulation into a tared aluminum sample pan. The weighed sample was carefully placed in the temperature cell of a DuPont 990 thermal analyzer with an empty aluminum reference pan. The cell was covered and the air flow set to 2800 cc/min. to insure ample air for oxidation. The instrument settings were pre-set to: Program Rate = 100° C./min.; Mode = Hold at Limit; Program = Heat; Time Base-1 min/in.; Axis range = 0.2; Sensitivity = 5; Temp. range = 25° C.-450° C. The instrument was activated and the oxidation exotherm was recorded. The weight of the area of the thermogram bounded by the exotherm trace the starting point reference line and the ten minute running time point was taken by photocopying the trace, cutting out the area bounded as indicated and weighing the cut-out. The weight of this area was divided by the sample weight and the quotient recorded as indicated in Tables I and II under the columns indicated as the 10 minute exotherm. These numbers are for relative comparisons and do not represent the actual heat generated though if desired the amount of heat liberated could be calculated. The results of these tests with samples of various experimental binder compositions are shown in Tables I and II.

The optimum ratios as indicated by the minimum exotherms in the thermal studies shown in Tables I and II tend to confirm the presence of coordinated products or pre-polymers of the type indicated in formulas I and II, particularly the coordination of boron, through nitrogen bonding, as well as through oxygen bonding. Prepolymers of the type indicated are also consistent with the solubility observed for the experimental binder compositions since the boron pre-polymer can be viewed as an ionized salt which has the added advantage of a higher than expected retention on the glass fiber when spray applied which is also consistent with the observed results in the working examples. Since exotherm reduction is an indication of punking reduction, the most effective temperature resistant products are those which give the lowest exotherm or show the maximum decrease in exotherm relative to binder systems prepared by using the modified phenol formaldehyde condensates without reaction with boric acid and nitrogenous compound. The preferred binder compositions are prepared by reacting a dicyandiamide condensate or a urea modified phenol formaldehyde condensate reacted with about 12 to 16 parts by wt. of boric acid for each 100 parts of wt. of condensate on a dry solids basis and about 40 to 80 parts by wt. of urea per 100 parts by wt. of condensate and about 4 to 6 parts by wt. of ammonium hydroxide for each 100 parts by wt. of condensate. Especially preferred compositions are those having about 15 parts by wt. of boric acid per 100 parts by wt. of condensate. The preferred amount of silane added as an optional adjuvant is a relatively small amount generally less than 0.05% by wt. of the total composition on a dry weight basis.

The following examples illustrate the invention without departing from the general descriptions elsewhere herein:

EXAMPLE 1

A mixing vessel equipped with a stirring device was charged with about 25 gallons of water. The stirring device was activated and the following ingredients were charged to the vessel at ambient temperatures with each successive addition being made when solution of the previous addition was complete: 225 lbs. of a dicyandiamide modified phenolic formaldehyde resin having a 56% solids content available from Reichhold Chemicals, Inc., Tuscaloosa, Alabama, as Polyophen 22-387; 58 lbs. of prilled urea (100% solids); 15 lbs. of granulated boric acid (100% solids); 15 lbs. of ammonium hydroxide (29% $NH_3$ assay); 63 gms. of gamma-aminopropyltriethoxysilane and sufficient water to provide 100 gallons of finished binder composition. Stirring was maintained for about one hour after which the binder composition was utilized in the following manner. The formulation was sprayed on glass fiber which was conveyed to a pipe molding station and wound onto a perforated metal mandrel. The wrapped mandrel was inserted into a metal forming mold and the entire assembly was heated rapidly to about 450° to 500° F. with a hot, forced-air stream. The mold assembly was removed from the air stream source and opened. The mandrel was pulled from the cured, formed pipe section. The glass fiber pipe section was trimmed and slit and tested in the following manner: Two molded pipe sections were mounted on a vertically oriented, electrically heatable, three inch diameter pipe, six feet in length. The dimensions of the molded sections were: Length-3 feet; Inside diameter-3.0 inches; Outside diameter-7.0 inches. (For brevity this size of pipe is designated as a 3×2 size i.e. Inside Diameter×Wall Thickness. The three foot length is understood as it is standard throughout the industry). The sections were firmly tied in position with glass fiber strands and overlayed with two additional molded sections having the following dimensions. Inside diameter-7.0 inches; Outside diameter-11.0 inches; Length-3.0 feet. This is designated a size 7×2 section.

The overlayed 7×2 sections were mounted in a manner such that all seams were staggered to minimize air flow and tied firmly in position as before.

The insulated, vertically oriented assembly was brought to a mininum temperature of at least 850° F. within a period of 35 minutes. The assembly was allowed to remain at the test temperature for a minimum of four hours. At the end of the high-temperature exposure period the heating was discontinued, the insulation sections removed and examined for evidence of binder punking and glass fiber sintering. The data and results for this test are summarized in Table 3 which follows:

TABLE 3

| | HIGH TEMPERATURE TEST RESULTS OF EXAMPLE 1 | | | | | |
|---|---|---|---|---|---|---|
| Test No. | Molded Pipe Size | Molded* Pipe Density | Binder** Content | Total Insulation Wall Thickness | Duration of Test | Results of Test |
| 1 | 3 × 2 | 5.8 | 6.5% | 4 inches | 4 hours @ 850° F. | No binder punking or sintering of the glass fibers. |
|  | 3 × 2 | 5.1 |  |  |  |  |
|  | 7 × 2 | 5.8 | to |  |  |  |
|  | 7 × 2 | 5.2 | 7.2% |  |  |  |
| 2 | 3 × 2 | 5.2 | 6.2% | 4 inches | 4 hours @ 850° F. | No binder punking or sintering of the glass fibers. |
|  | 3 × 2 | 5.3 |  |  |  |  |
|  | 7 × 2 | 6.6 | to |  |  |  |
|  | 7 × 2 | 6.1 | 7.2% |  |  |  |

*Density is in pounds per cubic foot and is the average density of the 3 foot pipe section.
**The binder content is the amount of binder which can be burned away at 1000° F. in one hour.

EXAMPLE 2

The preparation and application procedures of Example 3 were followed utilizing the following binder formulation:

| Ingredient | Amount |
|---|---|
| Dicyandiamide Modified Phenolic Resin sold by Reichhold Chemicals, Inc. as 22-387 Plyophen (56%) solids by wt. | 562 lbs. |
| Water | 50 gals. |
| Urea (100%) | 140 lbs. |
| Boric Acid | 45 lbs. |
| Ammonium Hydroxide | 36 lbs. |
| Gamma - aminorpopyltriethoxysilane | 158 grams |
| Water to | 250 gals. |

The glass fiber molded pipe sections were tested according to the procedures set forth in Example 1 except at an additional overlay of molded insulation product was applied to the electrically heatable, vertically oriented, metal test pipe. The dimensions of these molded sections were: Inside Diameter-11 inches; Outside Diameter-15 inches; Length-3 feet. This is designated a size 11×2 section. The tests were conducted as in Example 1 with the results shown in Table 4.

TABLE 4

| | HIGH TEMPERATURE TEST RESULTS OF EXAMPLE 2 | | | | | |
|---|---|---|---|---|---|---|
| Test No. | Molded Pipe Size | Molded Pipe Density | Binder Content | Total Insulation Wall Thickness | Temperature & Duration of Test | Results of Test |
| 1 | 3 × 2 | 5.2 | 7.2% | 4 inches | 4 hours @ 850° F. | No binder punking or sintering of the glass fibers. |
|  | 3 × 2 | 5.1 |  |  |  |  |
|  | 7 × 2 | 5.6 | to |  |  |  |
|  | 7 × 2 | 5.6 | 10.8% |  |  |  |
| 2 | 3 × 2 | 5.4 | 7.2% | 6 inches | 6 hours @ 850° F. | No binder punking or sintering of the glass fibers. |
|  | 3 × 2 | 5.2 | to |  |  |  |
|  | 7 × 2 | 5.8 | 10.8% |  |  |  |
|  | 7 × 2 | 5.6 |  |  |  |  |
|  | 11 × 2 | *NM | NM |  |  |  |
|  | 11 × 2 | NM | NM |  |  |  |
| 3 | 3 × 2 | 5.3 | 7.2% | 6 inches | 6 hours @850° F. | No binder punking or sintering of the glass fibers. |
|  | 3 × 2 | 5.2 | to |  |  |  |
|  | 7 × 2 | 5.3 | 10.8% |  |  |  |
|  | 7 × 2 | 5.2 |  |  |  |  |
|  | 11 × 2 | NM | NM |  |  |  |

TABLE 4-continued

HIGH TEMPERATURE TEST RESULTS OF EXAMPLE 2

| Test No. | Molded Pipe Size | Molded Pipe Density | Binder Content | Total Insulation Wall Thickness | Temperature & Duration of Test | Results of Test |
|---|---|---|---|---|---|---|
| | 11 × 2 | NM | NM | | | |

*NM indicated not measured but is within range of 5% to 11% of total weight of molded pipe insulation product.

EXAMPLE 3

The preparation and application procedures of Example 2 were followed utilizing the following binder formulation:

| Ingredient | Amount |
|---|---|
| 22-387 Plyophen availabe from Reichhold Chemicals, Inc., Dicyandiamide Modified Phenolic Resin (56%) | 225 lbs. |
| Water | 25 gals. |
| Urea (100%) | 68 lbs. |
| Boric Acid | 21 lbs. |
| Ammonium Hydroxide | 22 lbs. |
| Gamma - aminopropyltriethoxysilane | 63 gms. |
| Water to | 100 gals. |

The test procedures of Example 2 were followed except that higher test temperatures were used. The results of the tests are summarized in Table 5.

TABLE 5

HIGH TEMPERATURE TEST RESULTS OF EXAMPLE 3

| Test No. | Molded Pipe Size | Molded Pipe Density | Binder Content | Total Insulation of Wall Thickness | Temperature & Duration of Test | Results of Test |
|---|---|---|---|---|---|---|
| 1 | 3 × 2 | 5.2 | 6.2% Average | 6 inches | 6 hours at 900° F. | No binder punking or sintering of fibers. |
| | 3 × 2 | 5.5 | | | | |
| | 7 × 2 | 4.7 | | | | |
| | 7 × 2 | 5.3 | | | | No binder punking or sintering of fibers. |
| | 11 × 2 | *NM | | | | |
| | 11 × 2 | NM | | | | |
| 2 | 3 × 2 | 5.3 | 6.2% Average | 6 inches | 6 hours at 900° F. | No binder punking or sintering of fibers. |
| | 3 × 2 | 5.1 | | | | |
| | 7 × 2 | 5.5 | | | | |
| | 7 × 2 | 5.4 | | | | |
| | 11 × 2 | NM | | | | |
| | 11 × 2 | NM | | | | |
| 3 | 3 × 2 | 4.9 | | | | |
| | 3 × 2 | 4.9 | 6.2% Average | 6 inches | 6 hours at 1000° F. | No binder punking or sintering of fibers. |
| | 7 × 2 | 5.4 | | | | |
| | 7 × 2 | 5.4 | | | | |
| | 11 × 2 | NM | | | | |
| | 11 × 2 | NM | | | | |

*NM indicates not measured but is within 5% to 11% by wt. of total pipe insulation product.

I claim:

1. A heat curable aqueous binder composition for use as a glass fiber binder capable, when cured, of withstanding temperatures in the range of 750° F. to 900° F., consisting essentially of the reaction mixture of a water soluble modified phenol formaldehyde condensate, boric acid, ammonium hydroxide and urea; wherein said modified phenol formaldehyde condensate, consisting essentially of the reaction product of phenol, formaldehyde and a di-functional nitrogenous compound, is initially prepared by reacting one mole of a di-functional compound in which said functional groups are amido or imino groups capable of reacting with the hydroxymethylene groups of the poly-hydroxymethyl phenols formed by the condensation of phenol and formaldehyde, with about 2.5 to 3 moles of phenol and about 6 to 7.5 moles of formaldehyde such that said modified phenol formaldehyde condensate contains less than 2% by weight of free phenol and less than 5% by weight of free formaldehyde and about 12 to 15% by weight of nitrogen with substantially no unreacted nitrogenous compound; and, thereafter reacting said modified phenol formaldehyde condensate with about 12 to 16 parts by wt. of boric acid for each 100 parts by weight of said condensate, and about 40 to 80 parts by wt. of urea for each 100 parts by weight of said condensate and sufficient ammonium hydroxide so that the final composition has a pH of about 7 to 9.

2. The binder composition of claim 1 wherein the nitrogenous compound is selected from the group consisting of urea, dicyandiamide, guanidine, thiourea and melamine.

3. The binder composition of claim 2 wherein the nitrogenous compound is dicyandiamide.

4. The binder composition of claim 3 wherein the dicyandiamide modified phenol formaldehyde condensate has a mole ratio of about 2.5 parts phenol to about 7.5 parts formaldehyde to about 1 part dicyandiamide.

5. A process for preparing a heat curable aqueous binder composition for use as a glass fiber binder capable, when cured, of withstanding temperatures in the range of 750° F. to 900° F. which consists essentially of reacting about 12 to 16 parts by weight of boric acid with about 100 parts by weight of modified phenol formaldehyde condensate on a dry weight basis in an aqueous medium in the presence of about 40 to 80 parts by weight of urea and sufficient ammonium hydroxide so that the final composition has a pH of about 7 to 9; said modified phenol formaldehyde condensate consisting essentially of the reaction product of one mole of a di-functional nitrogenous compound in which said functional groups are amido or imino groups capable of reacting with hydroxymethylene groups of the poly-hydroxymethyl phenols formed by the condensation of phenol and formaldehyde reacted with about 6 to 7.5 moles of formaldehyde and about 2.5 to 7.5 moles of phenol and having a free phenol content of less than about 2% by weight and a free formaldehyde content of about less than 5% by weight and a nitrogen content of about 12 to 15% by weight with substantially no unreacted nitrogenous compound.

6. The process of claim 5 wherein the amount of boric acid is about 15 parts by weight for each 100 parts by weight of condensate solids.

7. The process according to claim 5 wherein the reaction is carried out in about 4 parts by weight of water for each part by weight of condensate.

8. The process according to claim 5 wherein the binder composition is subsequently diluted with water to provide a sprayable solution.

* * * * *